United States Patent
Ståhle

[19]

[11] Patent Number: 5,983,105
[45] Date of Patent: Nov. 9, 1999

[54] METHOD AND RECEIVER IMPLEMENTED ON THE RAKE PRINCIPLE

[75] Inventor: Lauri Ståhle, Espoo, Finland

[73] Assignee: Nokia Telecommunications Oy, Espoo, Finland

[21] Appl. No.: 08/819,368

[22] Filed: Mar. 17, 1997

[51] Int. Cl.[6] .................................................. H04Q 7/20
[52] U.S. Cl. ................................................................ 455/442
[58] Field of Search ........................... 455/432, 466, 455/62, 436; 375/350, 208, 335; 370/332, 335, 342

[56] References Cited

U.S. PATENT DOCUMENTS

| | | | |
|---|---|---|---|
| 5,325,394 | 6/1994 | Bruckert | 375/1 |
| 5,581,260 | 12/1996 | Newman | 342/374 |
| 5,594,755 | 1/1997 | Hulbert | 375/208 |
| 5,602,833 | 2/1997 | Zehavi | 370/209 |

FOREIGN PATENT DOCUMENTS

| | | |
|---|---|---|
| 195 09 601 | 9/1996 | Germany . |
| WO 97/00562 | 1/1997 | WIPO . |
| WO 97/29502 | 8/1997 | WIPO . |

*Primary Examiner*—William Cumming
*Attorney, Agent, or Firm*—Pillsbury, Madison & Sutro, LLP

[57] ABSTRACT

A method is provided for combining signals and a receiver implemented on the RAKE principle. The receiver includes a plurality of branches by which the receiver receives a signal, a precombining circuit which combines signals received via the branches of the receiver, a transmitter which transmits the precombined signals to a second receiver, and a combining circuit which combines the signals received via the receiver branches with the precombined signal.

16 Claims, 2 Drawing Sheets ated on the RAKE principle

METHOD AND RECEIVER IMPLEMENTED ON THE RAKE PRINCIPLE

FIELD OF THE INVENTION

The invention relates to a method for combining signals used by a cellular radio system in a softer hand-off situation.

BACKGROUND OF THE INVENTION

A receiver operating on the RAKE principle has a plurality of branches, each branch being capable of synchronizing to a different signal component. Consequently, the receiver is able to receive several signals simultaneously. RAKE receivers are used in CDMA receivers.

A CDMA (Code Division Multiple Access) system is a multiple access method which is based on spread spectrum technology and whose application in cellular radio systems has lately been initiated along with the earlier FDMA (Frequency Division Multiple Access) and TDMA (Time Division Multiple Access) technologies. The CDMA technology has several advantages over the earlier methods, such as spectral efficiency and simple frequency planning.

In a CDMA method, the narrow-band data signal of the user if multiplied by a spreading code of much wider bandwidth to a relatively wide band. In known experimental systems, the bandwidths used include, for example, 1.25 MHz, 10 MHz and 25 MHz. In the multiplying process, the data signal spreads across the entire band. All users transmit simultaneously by using the same frequency band. A separate spreading code is employed for each connection between a base station and a mobile station, and the signals from the users can be identified from one another in the receivers based on the spreading code of each connection. An attempt is made to select spreading codes so that the spreading codes are mutually orthogonal, i.e., do not correlate with each other.

In a typical radio system, such as a cellular radio system, a subscriber terminal communicates with one base station only. In, e.g., the CDMA system, a subscriber terminal may, however, also communicate with several base stations at the same time. In a prior art soft hand-off, an unbroken connection is maintained with a base station regardless of the hand-off. In such a hand-off, the base station typically changes. Also known in prior art is a softer hand-off in which the base station does not change, but the sector of the base station employed does. The soft and softer hand-offs are referred to as make-before-break type of hand-offs, which means that a new connection is established for a subscriber terminal before the previous base station connection is cut. Neither of these hand-offs change the frequency band used.

Cellular radio systems include cells that have been divided in sectors. A softer hand-off may be implemented, e.g., by placing in each sector a RAKE receiver which receives a signal. The signals received by the RAKE receivers placed in the sectors are routed via a bus to a combiner which carries out diversity combining for the signals. Diversity combining reduces the disadvantages caused by a fading signal. In practice, however, routing of signals to a combiner via a bus is difficult to implement because the implementation requires a very fast bus. In a cellular radio system, a base station receives a signal from the radio path by an antenna. Connecting the signals received by the antenna to a RAKE receiver causes additional problems. Problems occur particularly in case of a high capacity CDMA base station, which signifies a large number of signals to be connected.

Attempts have been made to overcome the aforementioned problems by grouping the RAKE receivers in a suitable manner. Such grouping has been accomplished with the receivers receiving antenna signals of a specific sector only. The grouping, however, has brought on new problems. A problem occurs when combining signals received by the RAKE receivers between receiver groups in different sectors. Combining signals has presented problems, especially in softer hand-off situations, particularly in high-capacity CDMA receivers. There have been attempts to overcome the problems met by routing the signals to a combiner which carries out diversity combining. The routing has, however, produced similar rate problems relating to the bus capacity as mentioned above.

A softer hand-off may be implemented, e.g., by detecting a signal first at a RAKE receiver, after which, instead of diversity combining, substantially the best diversity signal is chosen. This method, however, has not provided an acceptable performance level. An alternative to carrying out a hand-off is optimal combining of RAKE signals and signal detection. However, optimal signal combining is difficult to implement. The outputs of a Walsh-Hadamard transformation typically used at RAKE receivers are connected to the combiner, e.g., via the bus structure. In addition, the implementation is further impeded by the fact that the bus structure must be possible to configure to different kinds of softer hand-off situations dynamically. To implement the solution described above in practice has been difficult and problematic since very high rate requirements are set for the bus. In practice, the combining has been performed by direct summing of the signals of the RAKE receivers. In addition, the signals may have been weighted in different ways in the summing.

SUMMARY OF THE INVENTION

It is consequently an object of the present invention to implement a RAKE receiver in which signal combining is carried out optimally in a softer hand-off situation.

This object is achieved by a method for combining signals, employed by a cellular radio system that includes at least two receivers; a first receiver and a second receiver, which each receive a signal, each receivers being implemented on the RAKE principle and including a plurality of branches by means of which the receivers receives a signal, the method includes precombining the signals received via the receiver branches, transmitting the precombined signals of the first receiver to the second receiver and combining the precombined signal of the first receiver with the precombined signal of the second receiver.

The object is additionally achieved by a method for combining signals, employed by a cellular radio system that includes at least two receivers; a first receiver and a second receiver, which each receive a signal, each receiver being implemented on the RAKE principle and including a plurality of branches by means of which the receiver receives a signal, the method includes precombining the signals received via the branches of the first receiver, transmitting the precombined signal to the second receiver, and combining the precombined signal of the first receiver with the signals received via the branches of the second receiver.

The present invention also provides a receiver implemented on the RAKE principle which includes a plurality of branches by means of which the receiver receives a signal, a precombiner for precombing the signals received via the receiver branches, a transmitter for transmitting the precombined signals be to a second receiver, and a combiner for combining said precombined signals.

The present invention further provides a receiver implemented on the RAKE principle, which includes a plurality of branches by means of which the receiver receives a signal, a precombiner which precombining the signals received via the receiver branches, a transmitter for transmitting the precombined signals to a second receiver, and a combiner for combining the signal received via the plurality of branches with the precombined signal.

The receiver structure makes it possible to use the receiver in both a low and high capacity CDMA base station. The receiver operates in different modes of operation, and the receiver carries out the diversity combining. The diversity combining is distributed to be performed in different locations based on the mode operation being employed. The receiver enables optimal reception during normal reception. In a softer hand-off situation, reception is almost optimal. Distribution of diversity combining makes it possible to combine the receivers with a bus structure whose rate does not place restrictions to practical implementation of the bus structure. The solution enables combining all the RAKE branches of the receiver with one combiner. It is possible to use one combiner in normal combining of signals of one RAKE receiver. Further, in a softer hand-off situation, it is possible to employ one combiner in combining a signal transmitted from more than one sector of a cell in the cellular radio system.

BRIEF DESCRIPTION OF THE DRAWINGS

In the following, the invention will be described with reference to the examples in the accompanying drawings, in which.

DETAILED DESCRIPTION OF THE CURRENTLY PREFERRED EMBODIMENTS

Figure 1:
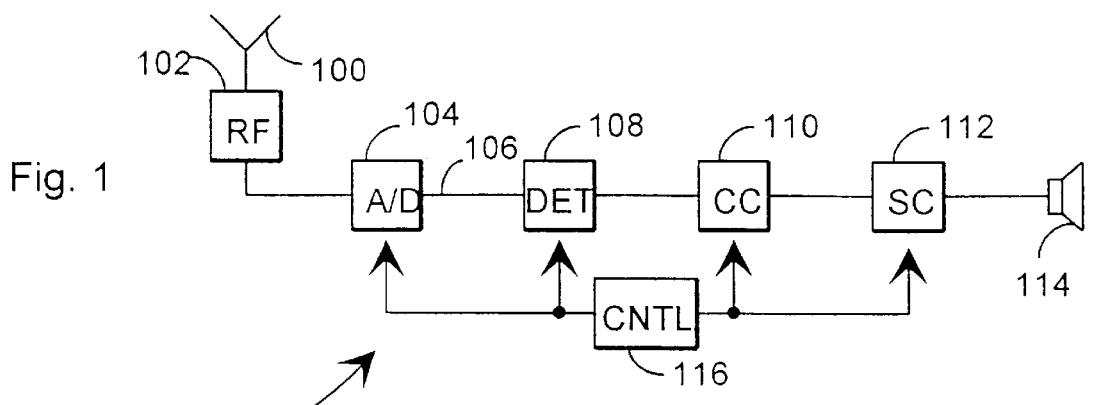
FIG. 1 illustrates a spread-spectrum receiver of the invention by means of a schematic block diagram.

At first, a general description will be offered of a receiver 20 according to the invention with the aid of the block diagram in FIG. 1. The figure shows a receiver of a subscriber terminal, but the inventive receiver may naturally be located at, e.g., a base station, too. The receiver 20 according to the invention comprises an antenna 100 which receives a signal to be applied to radio frequency parts 102 in which the signal is transformed to an intermediate frequency. From the radio frequency parts 102, the signal is fed to an analog-to-digital converter 104 in which the signal is sampled and converted to a digital form. The converted signal 106 is applied to a detector 108 at which the channel parameters of the signal and the desired symbols contained by the signal are detected.

The signal detected at the receiver of FIG. 1 is applied to a channel decoder 110 and a speech decoder 112, after which the decoded signal is applied to a loudspeaker 114. If a data terminal is in question, the speech decoder is replaced with some other decoder. Further, if a base station receiver is in question, the signal is applied after the channel coding block to other parts of the receiver. The receiver of the invention additionally comprises a control processor 116 which controls the operation of the other parts. The receiver according to the invention naturally comprises other components as well, such as filters and amplifiers, which is obvious for a person skilled in the art, but for reasons of clarity they are not shown in the figure.

Figure 2:
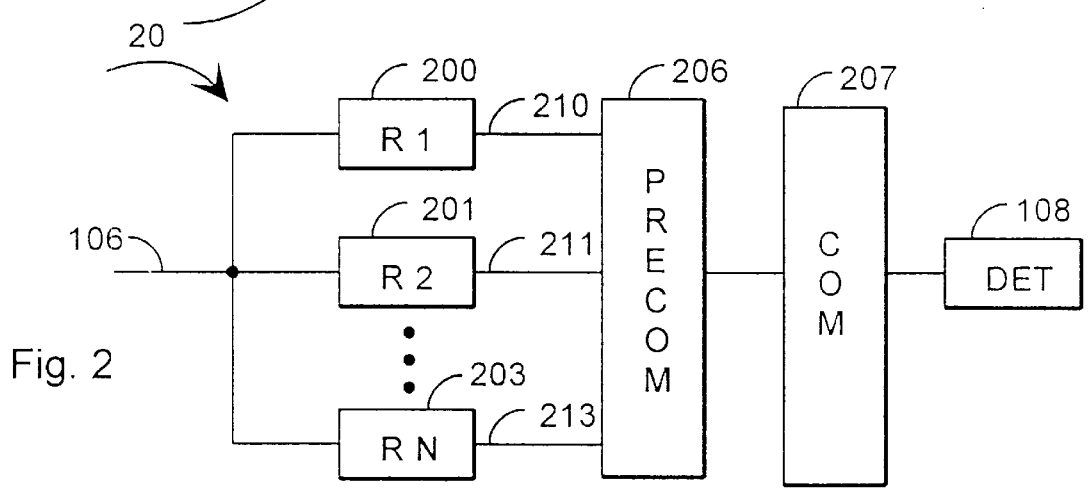
FIGS. 2 and 3 illustrate in closer detail the structure of the receiver according to the invention.

Next, the structure of the inventive receiver implemented on the RAKE principle is examined in more detail by means of the exemplary block diagram of FIG. 2. The receiver of the figure comprises four RAKE branches 200–203. In addition, the receiver comprises a precombiner 206 and a combiner 207. The RAKE branches are connected to the precombiner 206 with lines 210–213. The combiners 206 and 207 are functionally coupled to the branches 200–203. The branches are connected to the same input bus 106. Each branch independently receives signals allocated to the branch 200–203 in question, the signals being delayed with respect to one another. The RAKE branches 200–203 form an output signal from the signal by employing, e.g., a Walsh-Hadamard transformation, the output signal being then applied to the precombiner 206 via the lines 210–213. In practice, the branches 200–203 are correlators that are capable of synchronizing to the signal received. Each branch receives a signal independently, irrespective of the other branches. In a softer hand-off mode, the combiner 207 illustrated in the figure serves as the actual signal combiner.

Figure 3:
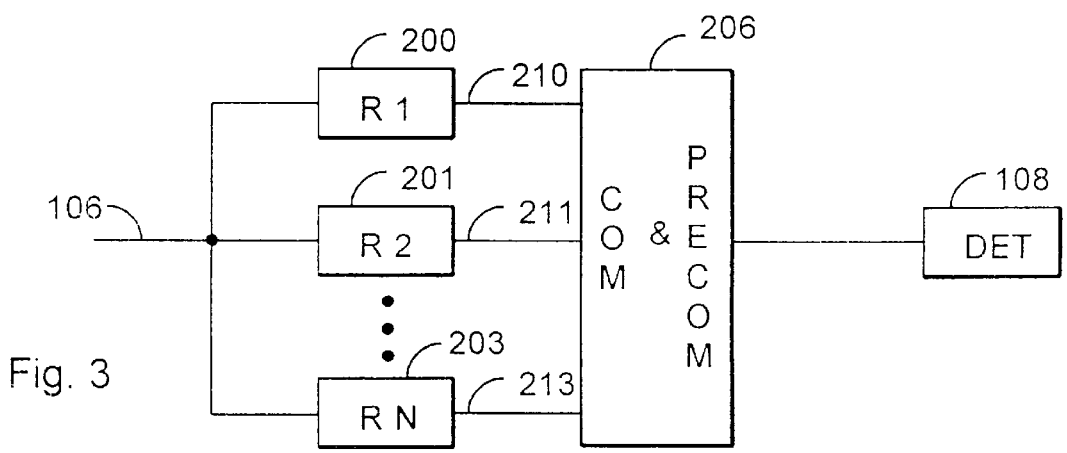

FIG. 3 illustrates a receiver comprising a combiner 206. The combiner 206 combines signals received via the branches 200–203. The combiner 206 may also combine precombined signals received from another receiver.

Figure 4:
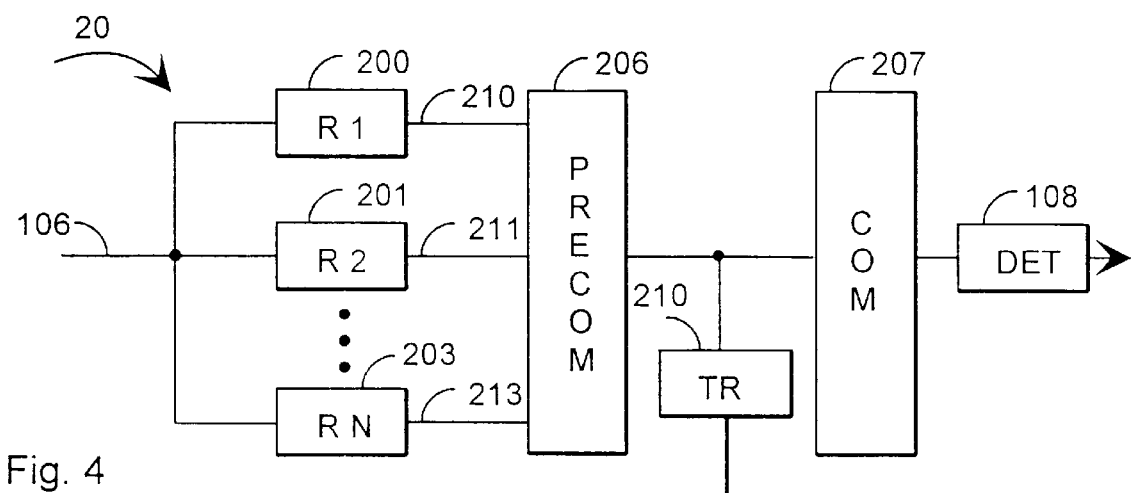
FIG. 4 shows two RAKE receivers according to the invention, which are interconnected with a bus.

FIG. 4 shows two receivers 20, 30 that are interconnected by an H bus 250. The receiver arrangement illustrated in the figure is based on distributed signal combining. Compared to concentrated combining, distributed combining makes it possible to reduce the rate employed at the H bus 250. The receiver according to the invention is capable of operation in different modes. Such modes of the receiver include, e.g., normal mode, softer and-off transmission mode, and softer hand-off receiving mode. Distributed signal combining according to the invention enables optimal signal combining in a softer hand-off situation. In the normal mode, the precombiner 206 only combines the signals of the branches 200–203 of the RAKE receiver in question. Following this, the combined signal is detected by the detector 108. In addition to detection, the detector 108 also decodes the signal.

In FIG. 4, both the receivers 20, 30 receive a signal and, by the precombiner 206, precombine the signals received. The receiver 20 comprises a transmitter 210 which transmit the precombined signals to the receiver 30. The receiver 30 may also comprise a transmitter 210. The receiver 20 transmits a signal to the receiver 30 via the bus 250. In the solution according to the figure, the receiver 30 receives by the combiner 207 a signal transmitted by the receiver 20. The signal precombined by the receiver 20 is in this case not necessarily transmitted to the combiner 207 of the receiver 20.

The precombiner 206 selects from the signals received, e.g., the ones whose quality is adequate to be precombined. The selection may be based on signal to noise ratio, bit error ratio, measuring the energy of the signal, or on measurements similar to those mentioned. The precombiner 206 may, in addition to the precombining, also combine the precombined signals, whereby a separate combiner 201 is not necessarily required. The solution set forth in FIG. 4 may also be realized with the receiver 20 first transmitting the signals it has precombined to the receiver 30. Following this, the combiner 206 of the receiver 30 combines the signals received via its branches 200–203 with the signal transmitted from the receiver 20.

Figure 5:
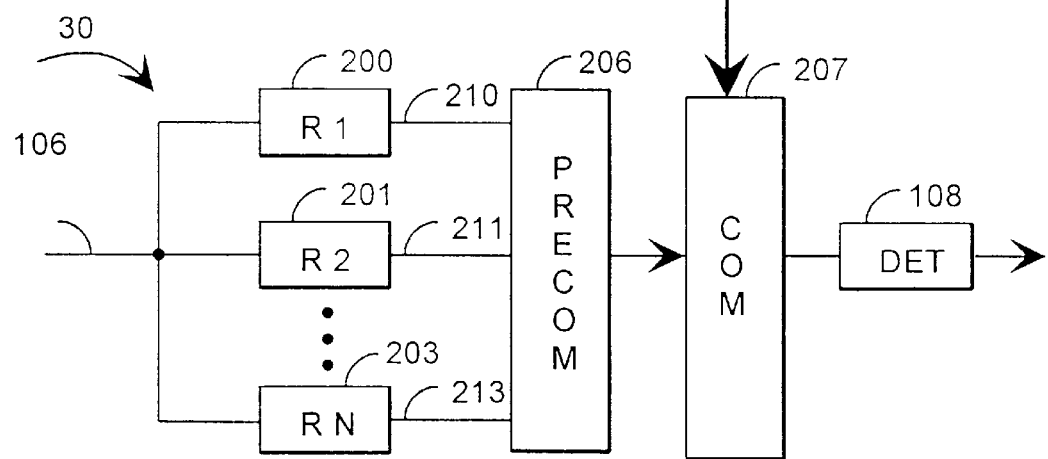
FIG. 5 represents a cellular radio network in which the receiver according to the invention is employed.
Figure 5:
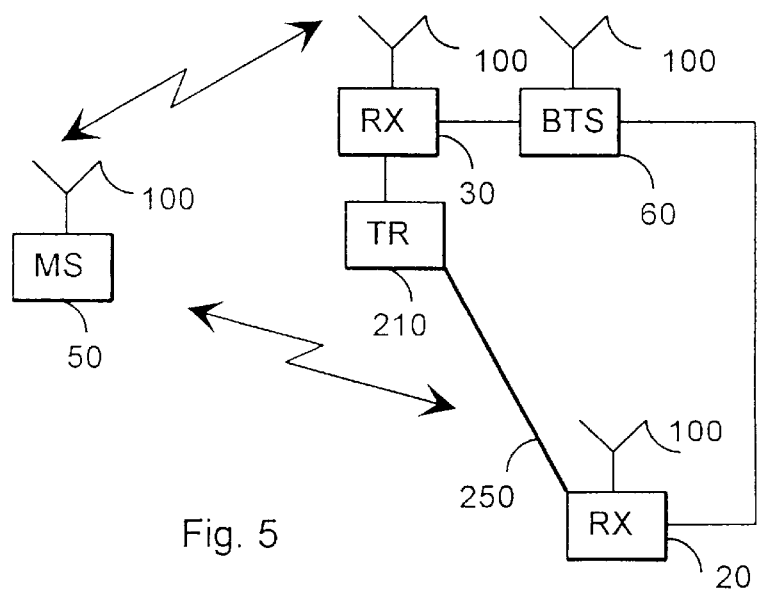

FIG. 5 shows a cellular radio system comprising a subscriber terminal 50 which has a simultaneous connection to both the RAKE receivers 20, 30. The cellular radio system further comprises a base station 60. It is assumed in the following that the receivers 20, 30 are located in different sectors. It is further assumed that the subscriber terminal 50 and the receiver 30 are located in the same sector. The receiver 30 receives signals transmitted by the subscriber terminal 50, which are precombined in the precombiner 206, 207 of the receiver 30. The receiver 30 transmits the signals it has precombined via the H bus 250 to the receiver 20 to be combined. In this situation, the receiver 30 is in the softer hand-off transmitting mode. In this case, the precombined signals received by the receiver 20 are combined with the precombined signal transmitted by the receiver 30. Signal combining, thus, is in this case carried out in the combiner 207 or 206 of the receiver 20. In the solution according to the figure, the subscriber terminal 50 comprises a RAKE receiver 40. The subscriber terminal 40 is in practice, e.g., a mobile phone. In the solution according to the figure, the RAKE receivers 20, 30 communicate with the base station 60. The RAKE receiver 30 may also be located at, e.g., the base station 60.

The receiver 20 also combines signals received by its different branches 200–203. The receiver 20 receives the precombined signal transmitted by the receiver 30. In the above situation, the receiver 20 is in the softer hand-off receiving mode. Following this, receiver 20 combines the precombined signal with the signal obtained from the different branches 200–203 of said receiver 20. In the situation above, the receiver 30 operator in the soft hand-off transmitting mode. In both the softer hand-off modes, the signals are combined in a distributed manner. The distributed combining is carried out by precombining the signals, after which the precombined signals are transmitted to be further combined with a signal received e.g., by another receiver.

The H bus interconnecting the RAKE receivers may be designed in many different ways. Thus may be, e.g., a 64-bit-wide parallel bus operating in time division principle. The RAKE receivers write result obtained in the precombining process to the bus. In addition, the receivers read out said results from the bus. It is assumed that a cell of a cellular radio network is divided into, e.g., six sectors, and 30 RAKE receivers are placed in each of the sectors. If the receiver takes samples that are 8 bits long from the signal 4800 times per second, the data rate of the combining will be 2.4576 Mbit/s. In case all the 180 receivers in the cell are coupled to the same serial mode bus, the total rate of the bus will be 442.368 Mbit/s. If the bus is 64 bits wide, the bus rate would be 6.912 Mhz. If, in turn, the bus is 128 bits wide, the bus rate is 3.456 MHz. The aforementioned bus rates can be achieved in practice.

The RAKE receiver according to the invention can be implemented e.g., on one ASIC circuit. The receiver may also be used at base stations requiring high capacity. However, it is not always justifiable to construct a high-capacity, multisector base station system at locations that require high capacity. The receiver according to the invention makes it possible to establish a multisector base station system by combining base station systems containing fewer cells.

Although the invention is in the above described with reference to the example of the accompanying drawings, it is obvious that the invention is not restricted thereto but it may be modified in various ways within the inventive idea of the attached claims.

I claim:

1. A method for combining signals used by a cellular radio system comprising at least two receivers, a first receiver and a second receiver, each said receiver receiving a signal, being implemented on the RAKE principle, and comprising a plurality of branches by which the receiver receives said signal, said method comprising:

precombining signals received via said receiver branches to form at least one precombined signal;

transmitting said precombined signal of said first receiver to said second receiver in a softer hand-off situation; and combining said precombined signal of said first receiver with said precombined signal of said second receiver to form a combined signal.

2. A method for combining signals used by a cellular radio system comprising at least two receivers, a first receiver and a second receiver, each said receiver receiving a signal, being implemented on the RAKE principle, and comprising a plurality of branches by which the receiver receives said signal, said method comprising:

precombining signals received via said plurality of branches of said first receiver to form at least one precombined signal, transmitting said precombined signal to said second receiver in a softer hand-off situation, and combining said precombined signal of said first receiver with signals received via said plurality of branches of said second receiver to form a combined signal.

3. The method as claimed in claim 1 or 2, wherein said combined signal formed from said precombined signals is detected and decoded.

4. The method as claimed in claim 1 or 2, wherein each branch receives a signal independently, irrespective of the other branches, and wherein said received signals are diversity-combined.

5. The method as claimed in claim 1 or 2, wherein the signal is transformed, after reception, by a Walsh-Hadamard transformation, or a transformation similar to said Walsh-Hadamard transformation.

6. The method as claimed in claim 1 or 2, wherein said cellular radio system includes cells that have been divided into sectors provided with receivers, and said method further comprising:

combining said precombined signal with signals received via branches of a receiver located in another sector.

7. The method as claimed in claim 1 or 2, wherein said receivers are interconnected by a bus, and wherein said precombined signal of said first receiver are transmitted along the bus to said second receiver.

8. The method as claimed in claim 1 or 2, wherein said cellular radio system including at least two base stations whose receivers receive a signal from their respective sectors, wherein said base stations are combined so that it is possible for a first base station to receive a signal received by another base station.

9. A receiver implemented on the RAKE principle said receiver comprising:

a plurality of branches by which said receiver receives a signal;

a precombiner which precombines signals received via said receiver branches to form at least one precombined signal;

a transmitter which transmits said precombined signal to a second receiver on a softer hand-off situation; and a combiner which combines said precombined signal.

10. A receiver implemented on the RAKE principle, said receiver comprising:

a plurality of branches by which said receiver receives a signal;

a precombiner which precombines the signals received via said receiver branches in a softer hand-off situation to form at least one precombined signal;

a transmitter which transmits said precombined signal to a second receiver; and a combiner which combines signals received via said branches with said precombined signal.

11. The receiver as claimed in claim 9 or 10, said receiver further comprising a detector which detects and decodes said signal combined by said combiner.

12. The receiver as claimed in claim 9 or 10, wherein precombiner precombines said signals received by said branches in case said precombined signal is transmitted to be combined with a signal received by a branch of another receiver.

13. The receiver as claimed in claim 9 or 10, wherein said combiner receives said signals from said branches of said receiver and combines said signals with said precombined signal.

14. The receiver as claimed in claim 9 or 10, said receiver further comprising a detector which detects and decodes said signal combined by said combiner, said detector preventing detection and decoding of said signal in said receiver in case said transmitter transmits said precombined signal to another receiver for combining.

15. The receiver as claimed in claim 9 or 10, wherein said precombiner and said combiner serve as diversity combiners, and wherein each branch of said receiver receives a signal independently, irrespective of the other branches.

16. The receiver as claimed in claim 9 or 10, wherein a branch transforms a signal received by a Walsh-Hadamard transformation or a transformation similar to said Walsh-Hadamard transformation.

* * * * *